(12) United States Patent
Bao et al.

(10) Patent No.: US 10,598,986 B2
(45) Date of Patent: Mar. 24, 2020

(54) BACKLIGHT ASSEMBLY AND DISPLAY DEVICE

(71) Applicants: BOE TECHNOLOGY GROUP CO., LTD., Beijing (CN); Fuzhou BOE Optoelectronics Technology Co., Ltd., Fuqing, Fuzhou, Fujian (CN)

(72) Inventors: Zongjie Bao, Beijing (CN); Hongyu Zhao, Beijing (CN); Qi Chen, Beijing (CN)

(73) Assignees: BOE TECHNOLOGY GROUP CO., LTD., Beijing (CN); Fuzhou BOE Optoelectronics Technology Co., Ltd., Fuqing, Fuzhou, Fujian (CN)

( * ) Notice: Subject to any disclaimer, the term of this patent is extended or adjusted under 35 U.S.C. 154(b) by 0 days.

(21) Appl. No.: 16/138,581

(22) Filed: Sep. 21, 2018

(65) Prior Publication Data

US 2019/0285947 A1 Sep. 19, 2019

(30) Foreign Application Priority Data

Mar. 15, 2018 (CN) .......................... 2018 1 0214325

(51) Int. Cl.
*G02F 1/1335* (2006.01)
*F21V 8/00* (2006.01)
*G02F 1/1333* (2006.01)

(52) U.S. Cl.
CPC ..... *G02F 1/133605* (2013.01); *G02B 6/0051* (2013.01); *G02B 6/0053* (2013.01); *G02B 6/0055* (2013.01); *G02B 6/0088* (2013.01); *G02F 2001/133342* (2013.01)

(58) Field of Classification Search
CPC ......... G02F 1/133605; G02F 1/133615; G02B 6/0055; G02B 6/0051; G02B 6/0088; G02B 6/0053; G02B 6/0075; G02B 6/0076; G02B 6/132; G02B 6/0063
See application file for complete search history.

(56) References Cited

U.S. PATENT DOCUMENTS

| | | | | |
|---|---|---|---|---|
| 7,527,411 | B2 * | 5/2009 | Watanabe | G02B 6/0038 362/602 |
| 7,777,833 | B2 * | 8/2010 | Hwang | G02B 6/0063 349/61 |
| 7,973,880 | B2 * | 7/2011 | Sumida | G02B 6/0033 349/65 |
| 9,488,769 | B2 * | 11/2016 | Brick | G02B 6/0041 |
| 9,625,637 | B2 * | 4/2017 | Yang | G02B 6/0035 |
| 2008/0037282 | A1 * | 2/2008 | Kurihara | F21V 9/00 362/618 |
| 2012/0314449 | A1 * | 12/2012 | McCollum | G02B 6/0038 362/602 |

\* cited by examiner

*Primary Examiner* — Peggy A Neils
(74) *Attorney, Agent, or Firm* — Foley & Lardner LLP

(57) ABSTRACT

The present disclosure relates to the field of display technology, particularly, discloses a backlight assembly and a display device. The backlight assembly includes a light guide plate and a light source. The light guide plate has a first light exiting surface and a second light exiting surface opposite to each other, and a light incident side intersecting with the first light exiting surface and the second light exiting surface. The light source is located at the light incident side of the light guide plate. The light guide plate has a refractive index which decreases first and then increases in a vertical direction from the first light exiting surface to the second light exiting surface.

20 Claims, 3 Drawing Sheets

BACKLIGHT ASSEMBLY AND DISPLAY DEVICE

CROSS-REFERENCE

The present application is based upon and claims priority to Chinese patent application No. 201810214325.8, filed on Mar. 15, 2018 and titled "Backlight Assembly And Display Device", and the entire contents thereof are incorporated herein by reference.

TECHNICAL FIELD

The present disclosure relates to the field of display, in particular, to the field of double-sided display, and specifically, discloses a backlight assembly and a display device.

BACKGROUND

At present, more and more service counters such as bank windows and government service windows, require transparent and open services. In such a scenario, it is often necessary for the server and the customer to simultaneously view a display, and sometimes even require them to make alternate operations. It is therefore the promotion of the appearance of double-sided displays. In such an application scenario, the double-sided display not only embodies the customer-centric humanized service, but also helps protect the customer's right to know and at the same time improve service efficiency.

Generally, in order to obtain a double-sided display system, two monitors are typically secured together using a fixed bracket. Due to the need for double light guide plates and backplanes, such double-sided display systems tend to have great weight, and the use of double materials has also led to the high cost of such double-sided display systems.

SUMMARY

According to a first aspect of the present disclosure, there is provided a backlight assembly. The backlight assembly includes a light guide plate and a light source. Specifically, in the backlight assembly, the light guide plate has a first light exiting surface and a second light exiting surface opposite to each other, and a light incident side intersecting with the first light exiting surface and the second light exiting surface. Further, the light source is located at the light incident side of the light guide plate. Moreover, the light guide plate has a refractive index which decreases first and then increases in a vertical direction from the first light exiting surface to the second light exiting surface.

According to an arrangement, the backlight assembly provided by the present disclosure further includes a reflective film. Specifically, the reflective film is located on a side of the light guide plate opposite to the light source. Alternatively, in other arrangements, the reflective film is located one or more of sides of the light guide plate intersecting with all of the first light exiting surface, the second light exiting surface and the light incident side.

According to an arrangement, in the backlight assembly provided by the present disclosure, the light guide plate includes a plurality of light guide films, and the plurality of light guide films are overlapped on each other in the vertical direction from the first light exiting surface to the second light exiting surface.

According to an arrangement, in the backlight assembly provided by the present disclosure, the plurality of light guide films include an odd number of light guide films. In this case, an intermediate light guiding film at a middle position has a minimum refractive index, and the refractive index of other light guiding films increases as a distance from the intermediate light guide film increases.

According to an example of the above arrangement, in the backlight assembly provided by the present disclosure, two light guide films respectively located on both surfaces of the intermediate light guide film and spaced apart from the intermediate light guide film by a same number of light guide films have a same refractive index.

According to an arrangement, the backlight assembly provided by the present disclosure further includes an optical film. Specifically, the optical film is provided on at least one of the first light exiting surface and the second light exiting surface in a film attaching manner. As an example, the optical film includes at least one of a diffusion film and a prism film.

According to an arrangement, the backlight assembly provided by the present disclosure further includes a light mixing layer. The light mixing layer is located on at least one of the first light exiting surface and the second light exiting surface of the light guide plate.

According to an example of the above arrangement, in the backlight assembly provided by the present disclosure, the light mixing layer includes a body portion and one or more heterogeneous portions distributed within the body portion, and the one or more heterogeneous portions have a different index from that of the body portion.

According to a further example, in the backlight assembly provided by the present disclosure, the one or more heterogeneous portions includes one or more interlayers disposed in parallel in the vertical direction from the first exiting surface to the second exiting surface.

According to another aspect of the present disclosure, there is provides a display device. Specifically, the display device includes: the backlight assembly described in anyone of the above arrangements; a first liquid layer, located on the first light exiting surface of the backlight assembly; and a second liquid layer located on the second exiting surface of the backlight assembly.

DETAILED DESCRIPTION

A backlight assembly and a display device including the same provided by an arrangement of the present disclosure will be described in detail below with reference to the accompanying drawings.

Figure 1:
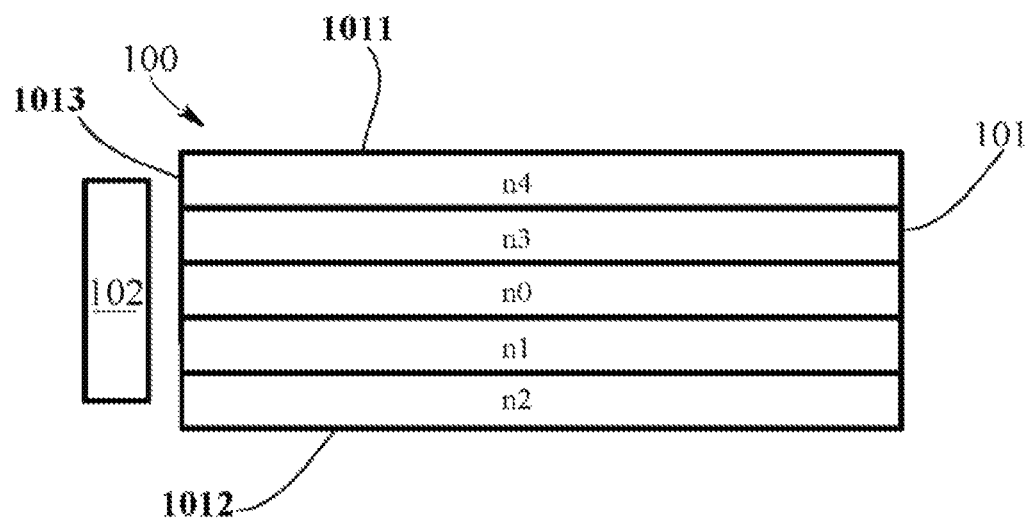
FIG. 1 schematically shows a cross-sectional view of a backlight assembly in accordance with an arrangement of the present disclosure.

Referring to FIG. 1, a schematic cross-sectional view of a backlight assembly in accordance with an arrangement of the present disclosure is illustrated. Specifically, the backlight assembly 100 may include a light guide plate 101 and a light source 102 disposed at a side of the light guide plate (for example, the left side 1013 in the drawing). In such an arrangement, the light emitted by the light source 102 may be incident on the left side 1013 first, and then enter into the inside of the light guide plate 101 through the left side 1013. It can be seen that in the light guide plate 101 shown in FIG. 1, the left side 1013 may serve as a it incident side of the light guide plate 101. Of course, those skilled in the art should understand that the light source 102 may also be disposed on other sides of the light guide plate 101, for example, the right side in FIG. 1, and the present disclosure is not limited thereto in this regard.

Referring to FIG. 1, in addition to the left side 1013 and the right side opposite to the left side 1013 stated above, the light guide plate 101 may further include a first light exiting surface 1011 and a second light exiting surface 1012 opposite to each other, i.e., the upper surface 1011 and the lower surface 1012 in FIG. 1. Further, the portion sandwiched between respective surfaces of the light guide plate 101 (i.e., the upper surface 1011, the lower surface 1012, the left side 1013, the right side, and the other two invisible sides) may be regarded as a body portion of the light guide plate 101.

In a specific example, the body portion of the light guide plate 101 has a refractive index that gradually changes from the upper surface 1011 to the lower surface 1012, for example, from top to bottom, the refractive index first decreases, and then increases after reaching a minimum value. As a possible implementation, such a body portion may be formed by stacking a plurality of light guide films (such as five light guide films shown in FIG. 1) in a top-to-bottom direction. Each of the light guide films has a different refractive index. Of course, those skilled in the art will appreciate that although the body portion of the light guide plate 101 is illustrated as being composed of five light guide films as an example in the drawings, the present disclosure should in no way be limited thereto. In fact, according to actual needs, the body portion of the light guide plate 101 may be formed by stacking other number (for example, an odd number or an even number) of light guide films on each other.

As shown in FIG. 1, in order that the refractive index decreases first and then increases from top to bottom, the refractive index of each light guide film of the light guide plate 101 may be selected such that the refractive indexes of the films from top to bottom are $n4$, $n3$, $n0$, $n1$, $n2$ respectively, where $n4>n3>n0<n1<n2$. As an alternative example, the refractive indexes and materials of the above respective light guide films may also be selected. For example, PET may be selected as the material of the $n2$ and $n4$ layers such that $n4=n2=1.65$; PC is selected as the material of the $n3$ and $n1$ layers such that $n3=n1=1.58$; and PMMA is selected as the material of the $n0$ layer such that $n0=1.48$. It is to be understood that the materials listed herein are by way of example only, and are not intended to limit the present disclosure.

As provided by an exemplary arrangement of the backlight assembly 100, the entire light guide plate 101 has a symmetric configuration with respect to the intermediate horizontal plane. Such a symmetrical structure and their associated beneficial technical effects will be explained in more detailed below with reference to FIG. 2. Such a symmetrical structure represents only one advantageous arrangement of the backlight assembly provided by the arrangements of the present disclosure, and the present disclosure should in no way be limited thereto. In fact, according to the foregoing description, in the backlight assembly 100 provided by the present disclosure, the light guide plate 101, specifically, the body portion of the light guide plate 101, may be formed by a plurality of light guide films having completely different refractive indexes, as long as the refractive indexes of light guiding films decrease first and then increase from the top to the bottom.

Next, how to use the backlight assembly provided by the arrangement of the present disclosure to implement the double-sided display effect will be explained in detail with reference to FIG. 2.

Figure 2:
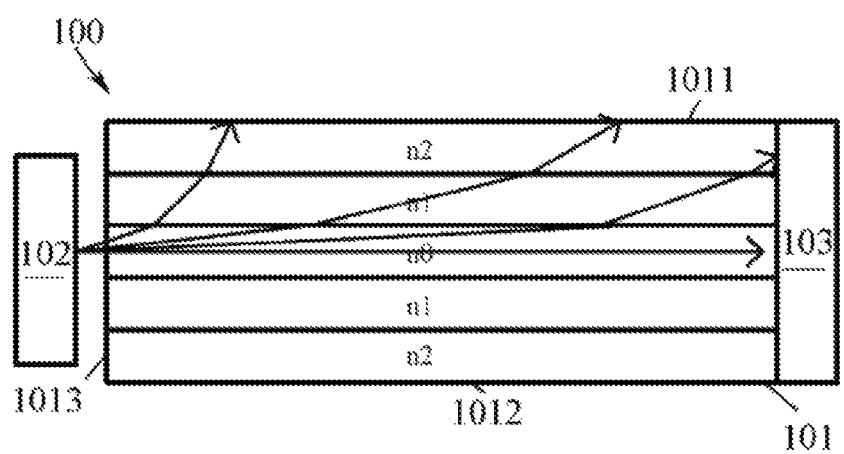
FIG. 2 schematically shows a cross-sectional view of a backlight assembly in accordance with another arrangement of the present disclosure.

Referring to FIG. 2, in a specific arrangement, in addition to the light guide plate 101 and the light source 102, the backlight assembly 100 may further include a reflective film 103. Such a reflective film 103 may be disposed in the backlight assembly 100 to be opposite to the light source 102. That is, in the backlight assembly 100, the reflective film 103 may be disposed at the right side of the light guide plate 101, i.e., the side opposite to the left side 1013 for disposing the light source 102. At this time, the refractive index of each light guide film of the light guide plate 101 may be selected such that the intermediate light guide film at the middle position has a minimum refractive index $n0$, and the two light guide films located on both surfaces of the intermediate light guide film and spaced apart from the intermediate light guide film by a same number of light guide films have a same refractive index. For example, referring to FIG. 2, both of the uppermost light guide film and the lowermost light guide film have a refractive index $n2$, and both of the light guide film sandwiched between the uppermost light guide film and the intermediate light guide film and that sandwiched between the lowermost light guide film and the intermediate light guide film have a same refractive index $n1$. In this manner, the light guide plate 101 may have a symmetrical structure with respect to the intermediate light guide film.

As shown in FIG. 2, in the backlight assembly 100, light emitted by the light source 102 may first incident on the light incident side (i.e., the left side) 1013, and then, may pass through the left side 1013 and enter into the inside of the light guide plate 101, that is, into the respective light guide films of the light guide plate 101.

When light enters into the light guide films of the light guide plate 101 from the left side 1013, for example, when light enters into the intermediate light guide film, light propagating in parallel to the light guide film will propagate to the right, reach the reflective film 103 and be reflected by the same (which will be further described below). On the contrary, if the light enters into the intermediate light guide film at a certain inclination angle, since the refractive index $n0$ of the intermediate light guide film is smaller than the refractive index $n1$ of the light guide films on both surfaces thereof, the light will no longer travel in a straight line. That is, the light will be refracted at the interfaces between the intermediate light guide film and the light guide films on both surfaces thereof. Therefore, the light will enter into the light guide films on both surfaces of the intermediate light guide film in a direction more inclined to the left side of the light guiding plate 101. Similarly, due to the refraction, when entering into the uppermost light guide film, the direction of light propagation will be further deflected to the left and the light eventually exits from the upper surface (i.e., the first light exiting surface) 1011 of the light guiding plate 101.

In this manner, the guiding of light from the light source is achieved by the upper half portion of the light guide plate 101 by means of multiple refractions at the interfaces between the plurality of light guide films. Finally, light is emitted from the top of the light guide plate 101 (that is, from the first light exiting surface 1011). For the lower half portion of the light guide plate 101, that is, the portion from the intermediate light guide film to the lowermost light guiding film, the guiding of the light is exactly the same as that of the upper half portion. This means that, as the light passes through the interfaces between the respective light guide films, it will gradually tilt toward the left side 1013 of the light guide plate 101, and finally will exit the light guide plate 101 from the second light exiting surface (i.e., the lower surface) 1012.

It can be seen that in the backlight assembly provided by the arrangement of the present disclosure, the backlight provided by a single backlight source can be divided into two parts by means of a light guide plate having a specific refractive index change, and the two parts of the backlight will be emitted from the upper and lower surfaces of the entire backlight assembly. This means that in a double-sided display system, the backlight assembly proposed by the present disclosure can be utilized instead of using two conventional light guide plates that are disposed in a back-to-back manner. This may reduce the thickness and hence the weight of the entire double-sided display system, thus facilitating the widespread use of the double-sided display system.

In addition, it should be noted that, according to an arrangement of the present disclosure, the light guide plate in the backlight assembly may be formed by stacking a plurality of film layers having different refractive indexes on each other. This is completely different from the structure of a conventional light guide plate in a conventional liquid crystal display device. In order to fabricate a conventional light guide plate, it is generally required to fabricate a dot structure on the optical waveguide, which tends to cause accumulation of foreign matters on the light guide plate. These foreign matters or impurities are extremely disadvantageous for the display of the entire device and thus the yield of the device. According to the inventive concept presented herein, in the light guide plate of the backlight assembly, there is no longer any subsequent dot structure. Instead, a simple stack of multiple light guide films having different refractive indexes is used. Therefore, with the backlight assembly provided by the arrangement of the present disclosure, particularly a light guide plate having a special design, an excellent display effect of the display device can be obtained, and thus, the product yield of the display device can also be greatly improved.

It should be noted that although the reflective film 103 is shown on the right side of the light guide plate 101 in FIG. 1 and the foregoing description, that is, opposite to the light source 102 of the light guide plate 101, the present disclosure should never be limited thereto. In fact, the reflective film 103 may also be disposed on the other side of the light guide plate, for example, the two sides that are not visible in the drawing, that is, the front and rear sides that are intersected with all of the left side 103 and the upper and lower surfaces 1011 and 1012. With the reflective film 103 provided on the side of the light guide plate 101, the portion of the light that may have leaked from the side of the light guide plate 101 will be reflected back into the light guide plate 101 by the reflective film 103. Therefore, it is advantageous to improve the backlight utilization of the entire backlight assembly 100, and also to avoid waste of light emitted by the light source 102.

As an alternative example, in the backlight assembly provided by the arrangement of the present disclosure, the reflective film 103 may be a roughened reflector. For example, the reflecting surface of the reflective film 103, that is, the reflecting surface facing the light guiding plate 101, has a high roughness. In this manner, light incident on the reflective film 103 will be diffusely reflected instead of being specularly reflected. Thus, the light is reflected away from the reflective film 103 in a relatively unorderly direction, and finally left the entire backlight assembly 100 in a relatively random exiting direction by the refractions between the respective light guide films of the light guide plate 101 (either through the upper surface 1011, either through the lower surface 1012). In such a case, since the direction of the light emitted from the backlight assembly is relatively random, the uniformity of the backlight provided by the backlight assembly is improved, and thus the display effect of the display system including such a backlight assembly is improved.

Figure 3:
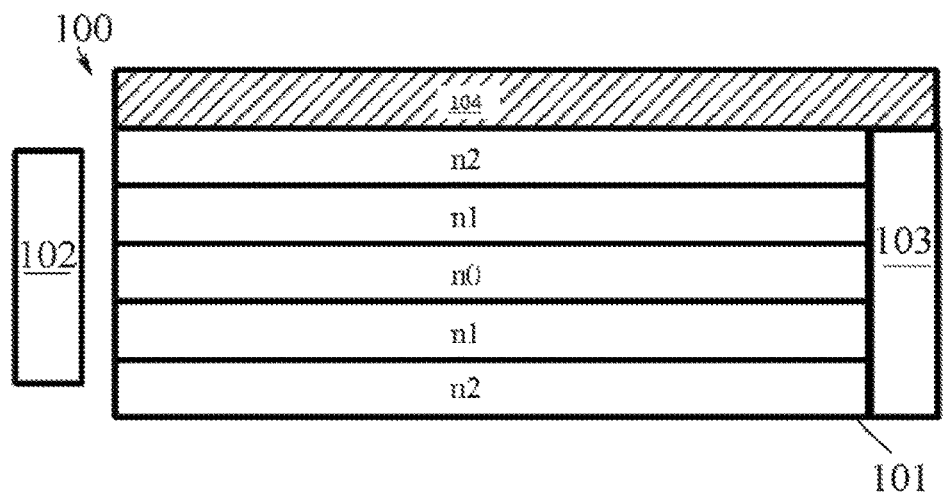
FIG. 3 schematically shows a cross-sectional view of a backlight assembly in accordance with yet another arrangement of the present disclosure.

Further, as an alternative example of the present disclosure, in the backlight assembly proposed above, the light guide plate may further include an optical film. Referring to FIG. 3, a cross-sectional view of a backlight assembly in accordance with yet another arrangement of the present disclosure is shown. Specifically, in this example, the backlight assembly 100 may further include an optical film 104 in addition to the light guide plate 101, the light source 102, and the reflective film 103. Although the optical film 104 is illustrated as being formed on the upper surface (i.e., the first light exiting surface) 1011 of the light guide plate 101 in FIG. 3, such an optical film 104 may be formed on the lower surface (i.e., the second light exiting surface) 1012 of the light guide plate 101 (for example, refer to FIG. 4 below), or may be simultaneously formed on the upper surface 1011 and the lower surface 1012. As an example, the optical film 104 may include a diffusion film and/or a prism film. The diffusion film may further diffuse the backlight to promote uniformity of light output. The prism film may be configured to split the light incident thereon to make the light output more suitable for the actual application scenario. Of course, it should be noted that the diffusion film and prism film provided herein by way of example represent only possible implementations for the optical film 104, and the present disclosure is not limited to such an example. In fact, those skilled in the art will be able to select any suitable optical film 104, such as a wavelength conversion film, filter film, etc., under the teachings of the present disclosure, and all of the alternative films should fall within the scope of the present disclosure.

As described above, in the backlight assembly 100, the body portion of the light guide plate 101 may be formed by a plurality of film layer structures having different refractive indices. This means that in the light guide plate 101, the light exiting surface (i.e., the first light exiting surface or the second light exiting surface) in contact with the optical film 104 is the outermost film layer, for example, the uppermost film layer in FIG. 3 (its refractive index is n2). It can be seen that in the backlight assembly proposed herein, the optical film 104 is in direct contact with another optical film layer, that is, a light guide film in the light guide plate 101, instead of a conventional light guide plate having a dot structure as usual. In other words, in order to add the additional optical film 104 to the backlight assembly 100, those skilled in the art may only attach two optical film (which means a homogeneous texture and similar structure rather than a completely different texture structure (e.g., in a conventional scheme, an optical film layer having a uniform surface and a light guide structure having a regular dot distribution) together. Obviously, the attaching between optical films of the same texture is simpler and more efficient than conventional solutions. As an example, the optical film 104 may be formed on any one of the two light exiting surfaces 1011 and 1012 of the light guide plate 101 by a common film attaching method. Of course, such a film attaching means is for illustrative purposes only and does not represent any limitation to the present disclosure. In fact, under the teachings of the present disclosure, those skilled in the art will be able to select any suitable film bonding means according to actual needs, and the present disclosure is intended to encompass all such possible solutions.

Figure 4:
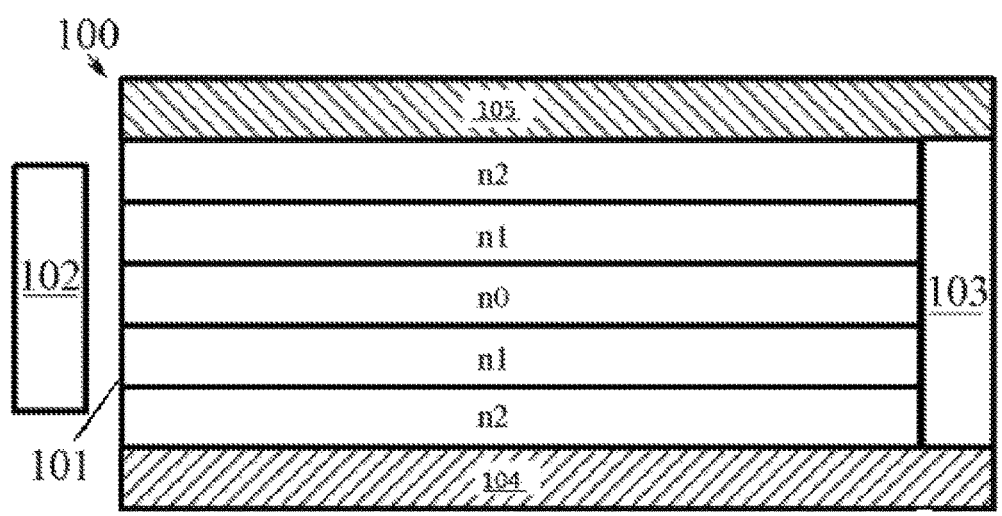
FIG. 4 schematically shows a cross-sectional view of a backlight assembly in accordance with still another arrangement of the present disclosure.

According to a further arrangement of the present disclosure, the backlight assembly proposed above may further include a light mixing layer. Specifically, as shown in FIG. 4, in addition to the optical film 104 formed on the lowermost light guide film of the light guide plate 101, the backlight assembly 100 may further include a mixing layer 5 formed on the uppermost light guide film of the light guiding plate 101. Of course, it should be noted that although the light mixing layer 105 is shown as being formed on the uppermost light guide film of the light guide plate 101 in FIG. 4, that is, formed on the first light exiting surface 1011 of the light guide plate 101, according to other arrangements of the present disclosure, the light mixing layer 105 may also be formed on the second light exiting surface 1012 of the light guide plate 101, or may be formed on both of the light exiting surfaces 1011 and 1012. The present disclosure is intended to encompass all of these alternative locations for the light mixing layer 105. Such a light mixing layer 105 may be configured to mix light of different directions emitted from the uppermost light guide film of the light guide plate 101 to promote uniform output of light from the entire backlight assembly 100. The mixing of light in different directions by the light mixing layer 105 will be described in further detail below with reference to FIG. 5.

Figure 5:
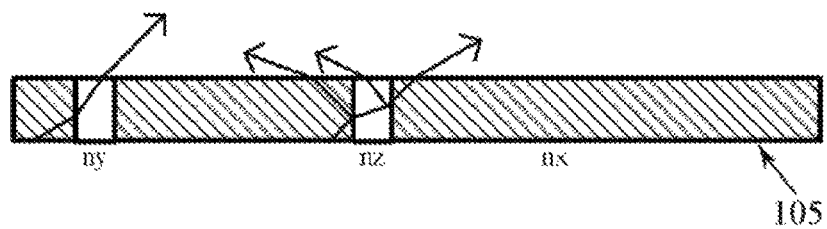
FIG. 5 schematically shows a cross-sectional view of a light mixing layer in a backlight assembly in accordance with an arrangement of the present disclosure.

Referring to FIG. 5, a cross-sectional view of a light mixing layer 105 in accordance with an arrangement of the present disclosure is shown. Specifically, the light mixing layer 105 may include a body portion and one or more heterogeneous portions. In FIG. 5, the main body portion is illustratively shown with a left-titling hatching, and the heterogeneous portion is shown with a blank frame. Here, it should be noted that the expression "heterogeneous portion" herein is used to indicate those portions different from the body portion of the light mixing layer 105. As an example, such heterogeneous portions may be formed by a different material than the body portion, or may be formed by different treatments on the same material. Alternatively, in the light mixing layer 105 described above, one or more heterogeneous portions may also be formed by different doping of the body portion of the light mixing layer 105. Under the teachings of the present disclosure, those skilled in the art should be able to select any suitable material, doping, processing, etc. to form the body portion and the heterogeneous portion according to actual needs, as long as the refractive indexes of the body portion and the heterogeneous portion may be different. Specifically, in such a light mixing layer 105, the body portion may have a refractive index nx, and the heterogeneous portion may have a refractive index ny, nz, or the like, where nx is not equal to ny, nz, or the like. Alternatively, such a heterogeneous portion may be formed by one or more intermediate interlayers, wherein the intermediate interlayer may pass through the entire light mixing layer 105 from top to bottom. Of course, it should be noted that one or more heterogeneous portions may not pass through the entire light mixing layer 105, that is, may only be distributed inside the body portion of the light mixing layer 105, just like one or more doping portions in a single uniform layer. Further, such a heterogeneous portion may have a layered structure, for example, may be hovered in the body portion of the light mixing layer 105 like a bubble. It will be apparent to those skilled in the art that the present disclosure is intended to encompass all such alternatives.

With reference to FIG. 5, since the refractive indexes ny, nz of the intermediate interlayers are different from the refractive index nx of the body portion, when light is incident from the body portion onto the intermediate interlayer, it will inevitably not maintain a straight line propagation, that is, the light will be refracted. Illustratively, in FIG. 5, the refractive index ny of the left interlayer is selected to be larger than the refractive index nx of the body portion, and the refractive index nz of the right interlayer is smaller than the refractive index nx of the body portion. Of course, such an example does not represent any limitation to the present disclosure, and the refractive indexes ny, nz of the respective interlayers may be arbitrarily selected according to actual needs, as long as it is different from the refractive index nx of the body portion. At this time, since ny>nx, the light will be refracted twice when entering and leaving the left interlayer, resulting in a completely different exiting direction than that would be without an intermediate interlayer. Similarly since nz<nx, light will, for example, undergo a transflective phenomenon when entering and leaving the right interlayer, thus causing a portion of the light to exit the light mixing layer 105 from the left side of the right side interlayer. In any case, by means of the non-uniform refractive index distribution of the light mixing layer 105 (i.e., including a body portion and one or more foreign portions having different refractive indexes), as compared to the case where the light mixing layer 105 is not provided, it promotes the emission of incident light in a more unorderly direction, thus facilitating the uniformity of light emission of the entire backlight assembly. Furthermore, by means of for example an intermediate interlayer having a refractive index nz smaller than the refractive index nx of the body portion, the light will tend to be deflected to the left than that would be without the intermediate interlayer, thus the problem that the viewing angle of the light guide plate including a plurality of light guiding films is not uniform would be prevented to some extent, which is more suitable for an application scenario requiring highly uniform viewing angle.

Figure 6:
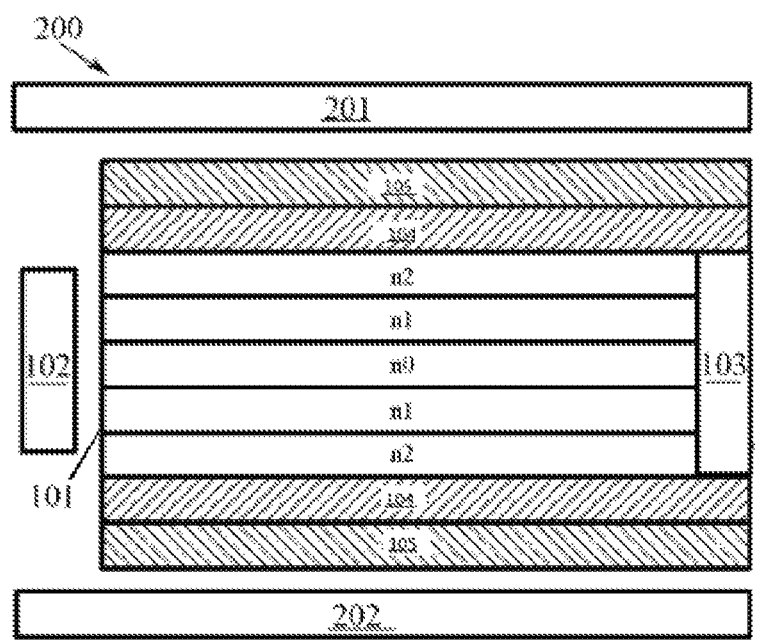
FIG. 6 schematically shows a cross-sectional view of a display device in accordance with an arrangement of the present disclosure.

According to another aspect of the present disclosure, there is also provided a display device, which can be used for example for double-sided display. Referring to FIG. 6, a cross-sectional view of a display device in accordance with an arrangement of the present disclosure is schematically illustrated. Specifically, the display device 200 may include: the backlight assembly 100 described in any one of the above arrangements; a first liquid crystal layer 201 located on the upper surface of the backlight assembly 100; and a second liquid crystal layer 202 located on the lower surface of the backlight assembly 100. In addition, as shown in FIG. 6, in the display device 200, the backlight assembly 100 may further include two sets of an optical film 104 and a light mixing layer 105 respectively formed on the upper surface and the lower surface. In such a display device 200, after passing through the light guide plate 101, the light from the light source 102 is split into two portions, which exit respectively from the upper and lower surfaces, and enter into the first liquid crystal layer 201 and the second liquid crystal layer 202, thus achieving double-sided display.

It is apparent that in the display device provided by the arrangement of the present disclosure, the use of a conventional light guide plate having a dot structure is avoided. Instead, a novel light guide plate including a plurality of light guide films stacked is used. In this manner, the overall weight of the finally formed double-sided display system is greatly reduced, and problems such as foreign matter remaining due to the forming of the dot structure are also avoided. Thus, the simple, low-cost and controllable production of the double-sided display system is realized, and the excellent double-sided display effect is also facilitated.

Those skilled in the art will appreciate that the term "substantially" herein may also include arrangements having "entirely", "completely", "all", and the like. Thus, in an arrangement, the term "substantially" may also be removed. Where applicable, the term "substantially" may also relate to 90% or higher, such as 95% or higher, particularly 99% or higher, even more particularly 99.5% or higher, including 100%. The term "comprising/including" also includes an arrangement in which the term "comprising/including" means "consisting of". The term "and/or" particularly relates to one or more of the items mentioned before and after "and/or". For example, the phrase "item 1 and/or item 2" and similar phrases may relate to one or more of items 1 and 2. The term "comprising/including", in the arrangement may mean "consisting of", but in another arrangement may mean "comprising/including at least the defined items and optionally one or more other items".

In addition, the terms first, second, third, etc. in the specification and claims are used to distinguish similar elements and are not necessarily used to describe the sequence or chronological order. It is to be understood that the terms so used are interchangeable, where appropriate, and that the arrangements of the present disclosure described herein can operate in other sequences than those described or illustrated herein.

It should be noted that the above-mentioned arrangements are illustrative and not limiting, and that many alternative arrangements can be devised without departing from the scope of the appended claims. In the claims, any reference signs placed between parentheses shall not be construed as a limitation. The use of the verb "comprise" and its conjugations does not exclude the presence of the elements or steps other than those recited in the claims. The article "a" or "an" before an element does not exclude the case that there are a plurality of such elements. The present disclosure can be implemented by means of hardware including several discrete components, and by means of a suitably programmed computer. In the device claim enumerating several devices, several of these devices can be embodied by the same hardware item. The mere fact that certain measures are recited in mutually different dependent claims does not mean that the combination of these measures cannot obtain benefit.

The present disclosure is also applicable to a device that includes one or more of the characterizing features described in the specification and/or shown in the drawings. The present disclosure is also directed to a method or process that includes one or more of the characterizing features described in the specification and/or illustrated in the drawings.

The various aspects discussed in this patent can be combined to provide additional advantages. Additionally, some of the features may form the basis of one or more divisional applications.

What is claimed is:

1. A backlight assembly, comprising a light guide plate formed of a resin and a light source, wherein
   the resin comprises at least one of PET, PC, or PMMA,
   the light guide plate has a first light exiting surface and a second light exiting surface opposite to each other, and a light incident side intersecting with the first light exiting surface and the second light exiting surface,
   the light source is located at the light incident side of the light guide plate,
   the light guide plate comprises a plurality of light guide films, each of which is formed of the resin,
   the plurality of light guide films are overlapped on each other in a direction from the first light exiting surface to the second light exiting surface,
   the plurality of light guide films comprises a first light guide film and a plurality of second light guide films disposed on two side of the first light guide film,
   the first light guide film has a refractive index smaller than that of any one of the plurality of second light guide films, and
   the refractive indexes of the plurality of second light guide films increase as a distance from the first light guide film increases.

2. The backlight assembly of claim 1, further comprising a reflective film, wherein
   the reflective film is located on at least one of a side of the light guide plate opposite to the light source and sides of the light guide plate intersecting with all of the first light exiting surface, the second light exiting surface and the light incident side.

3. The backlight assembly of claim 1, wherein
   the plurality of light guide films comprise an odd number of light guide films,
   an intermediate light guiding film at a middle position has a minimum refractive index, and
   respective refractive indices of other light guiding films increase as a distance from the intermediate light guiding film increases.

4. The backlight assembly of claim 3, wherein
   two light guide films respectively located on both surfaces of the intermediate light guiding film and spaced apart from the intermediate light guiding film by a same number of light guide films have a same refractive index.

5. The backlight assembly of claim 1, further comprising an optical film, wherein
   the optical film is provided on at least one of the first light exiting surface and the second light exiting surface in a film attaching manner.

6. The backlight assembly of claim 5, wherein
   the optical film comprises at least one of a diffusion film and a prism film.

7. The backlight assembly of claim 1, further comprising a light mixing layer, wherein
   the light mixing layer is located on at least one of the first light exiting surface and the second light exiting surface of the light guide plate.

8. The backlight assembly of claim 7, wherein
   the light mixing layer comprises a body portion and one or more heterogeneous portions distributed within the body portion, and the one or more heterogeneous portions have a different index from that of the body portion.

9. The backlight assembly of claim 8, wherein
the one or more heterogeneous portions comprises one or more interlayers disposed in parallel in the vertical direction from the first exiting surface to the second exiting surface.

10. A display device, comprising a backlight assembly, a first liquid crystal layer, and a second liquid crystal layer, wherein
the backlight assembly comprises a light guide plate formed of a resin and a light source, the resin comprises at least one of PET, PC, or PMMA, the light guide plate has a first light exiting surface and a second light exiting surface opposite to each other and a light incident side intersecting with the first light exiting surface and the second light exiting surface, and the light source is located at the light incident side of the light guide plate,
the first liquid crystal layer is located on the first light exiting surface of the backlight assembly, and
the second liquid crystal layer is located on the second exiting surface of the backlight assembly,
wherein
the light guide plate comprises a plurality of light guide films, each of which is formed of the resin,
the plurality of light guide films are overlapped on each other in a direction from the first light exiting surface to the second light exiting surface,
the plurality of light guide films comprises a first light guide film and a plurality of second light guide films disposed on two sides of the first light guide film,
the first light guide film has a refractive index smaller than that of any one of the plurality of second light guide films, and
the refractive indexes of the plurality of second light guide films increase as a distance from the first light guide film increases.

11. The display device of claim 10, wherein
the backlight assembly further comprises a reflective film, and
the reflective film is located on at least one of a side of the light guide plate opposite to the light source and sides of the light guide plate intersecting with all of the first light exiting surface, the second light exiting surface and the light incident side.

12. The display device of claim 10, wherein
the plurality of light guide films comprise an odd number of light guide films,
an intermediate light guiding film at a middle position has a minimum refractive index, and
respective refractive indices of other light guiding films increase as a distance from the intermediate light guiding film increases.

13. The display device of claim 10, wherein
two light guide films respectively located on both surfaces of the intermediate light guiding film and spaced apart from the intermediate light guiding film by a same number of light guide films have a same refractive index.

14. The display device of claim 10, wherein
the backlight assembly further comprises an optical film, and
the optical film is provided on at least one of the first light exiting surface and the second light exiting surface in a film attaching manner.

15. The display device of claim 14, wherein
the optical film comprises at least one of a diffusion film and a prism film.

16. The display device of claim 10, wherein
the backlight assembly further comprises a light mixing layer, and
the light mixing layer is located on at least one of the first light exiting surface and the second light exiting surface of the light guide plate.

17. The display device of claim 16, wherein
the light mixing layer comprises a body portion and one or more heterogeneous portions distributed within the body portion, and
the one or more heterogeneous portions have a different index from that of the body portion.

18. The display device of claim 17, wherein
the one or more heterogeneous portions comprises one or more interlayers disposed in parallel in the vertical direction from the first exiting surface to the second exiting surface.

19. The backlight assembly of claim 4, wherein the plurality of light guide films comprise a first light guide film, a second light guide film, a third light guide film as the intermediate light guide film, a fourth light guide film and a fifth light guide film in the direction from the first light exiting surface to the second light exiting surface, and
wherein the first and fifth light guide films are formed of the PET, the second and fourth light guide films are formed of the PC, and the third guide film is formed of the PMMA.

20. The backlight assembly of claim 19, wherein the first and fifth light guide films have the refractive index of 1.65, the second and fourth light guide films have the refractive index of 1.58, and the third guide film has the refractive index of 1.48.

* * * * *